Patented July 13, 1954

2,683,668

UNITED STATES PATENT OFFICE 2,683,668

ORGANIC COATING COMPOSITIONS

Henry W. Godshalk, Swarthmore, Pa., assignor to E. I. du Pont de Nemours & Company, Wilmington, Del., a corporation of Delaware No Drawing. Application April 1, 1950, Serial No. 153,498

15 Claims. (Cl. 106—193)

This invention relates to coating compositions and, more particularly, to improvements in organic paints, varnishes, lacquers, synthetic resin enamels, coatings for fabric substrates, unsupported films, and the like.

It has long been known that the incorporation of certain pigments extends the useful life of organic film-forming materials; i. e., the pigmented film lasts longer than the unpigmented film. For example, it is known that nitrocellulose lacquers, vegetable oil modified alkyd resins, oleoresinous varnishes, vegetable drying oils, and other conventional organic film-forming materials last considerably longer outdoors when pigmented with carbon black than when unpigmented. Other conventional pigments, such as titanium dioxide, basic lead carbonate, zinc oxide, iron blues, chrome yellows, etc., generally impart longer life to exterior organic finishes and may be described as "durable."

Some conventional pigments do not enhance, and may actually shorten the outdoor life of organic coatings, but these are generally used only where a specifically desirable property, usually color or cheapness, outweighs the undesirable property. Very generalized examples of these are organic maroons, phthalocyanine pigments, and most extenders, which may be described as "non-durable."

When opacity, color and other physical characteristics of a pigment are discussed herein, it is to be understood that the pigment has been processed into the form of a uniform dispersion in a film-forming material by known dispersing, milling or grinding techniques, and that the deposited cured films are relatively thin, on the order of not more than 5 mils (0.005 in. thick) except in the cases of coated fabrics and unsupported films where greater thicknesses are common.

Unfortunately, along with its film life prolonging action, each of the hitherto known durable pigments possesses, or develops during the prolonged life of the film, at least one deficiency which limits its usefulness. Most durable pigments possess a characteristic color which is often desirable, but which restricts their use to coatings of the same or similar colors, or colors blended therewith. They also possess opacity; i. e., the pigment particles suspended in a transparent organic film-forming material render the film relatively opaque to visible light. This opacity is desirable in finishes which are required to hide the substrate, but is undesirable in colored or colorless coatings where transparence or translucence is required. It is also unfortunate that, when the color or opacity of a durable pigment is desired, the quantity of the pigment required for the proper color or hiding is usually less than that required for the optimum improvement in film durability. For example, a small amount of carbon black produces complete hiding of the substrate and an intense black color, but a relatively larger amount is required to yield the maximum improvement in film life.

A similar but opposite effect generally pertains to non-durable pigments. For instance, a relatively large amount of organic maroon pigment is usually required for the desired color and hiding, and this amount normally hastens film deterioration.

There are some known pigments, for instance, certain extenders such as barium sulfate, magnesium silicate, kaolin, etc., which under some conditions lengthen film life and which produce pigmented films that are originally substantially transparent and colorless. However, films containing these otherwise satisfactory pigments develop opacity outdoors earlier than unpigmented films.

Hence, the present art in organic coatings is accustomed to using (1) organic film-forming materials, the outdoor life of which can be improved by proper pigmentation, (2) pigments which provide sufficient color or opacity in relatively low concentrations, but which yield maximum improvement in film life only in higher concentrations, and (3) pigments which are required for their useful color or cheapness but which do not materially prolong film life and may even shorten film life or otherwise impair the desirable qualities of the product.

Thus, it is apparent that there is a need for a pigment which prolongs the outdoor life of organic coatings without imparting color or opacity to the film, so that the presence of this pigment is not apparent visually and does not appreciably limit the uses to which the film-forming material otherwise could be put. A further requirement is that the pigment does not subsequently impart opacity or color to the film during service of prolonged duration. Such a pigment would (1) reduce the amount of durable pigment used in a finish to that smaller quantity required for proper color and/or opacity, or (2) prolong the life of a coating pigmented with necessary large amounts of a non-durable pigment.

It is, therefore, the principal object of this invention to provide organic coatings containing a pigment which independently extends the outdoor life of the film-forming material, but which does not itself impart appreciable color or opacity to the film, originally or during prolonged service.

Another object is to provide pigmented organic coatings which are transparent, which possess substantially the same color as the unpigmented film and retain these characteristics during prolonged service, and which are substantially more durable outdoors than an unpigmented coating of the same organic film-forming material.

A further object is to provide colored organic coatings which contain a substantially colorless transparent pigment capable independently of substantially prolonging the outdoor life of the colored coatings and which contain pigmentary material, having certain undesirable durability or other characteristics, only to the extent required for the desired degree of coloring.

Still another object of this invention is to provide opaque organic coatings which contain a substantially colorless transparent pigment capable independently of substantially prolonging the outdoor life of the opaque coating and which contain opacifying pigmentary material, having certain undesirable durability or other characteristics, only to the extent required for the desired degree of opacity.

Other objects will become apparent with the description of this invention.

These objects are accomplished by providing a coating composition comprising an organic film-forming material and, uniformly dispersed therein, a finely divided precipitate of nickelous hydroxide.

More specifically, these objects are accomplished by incorporating into an organic film-forming material a washed precipitate consisting of nickelous hydroxide, by means of dispersing the precipitate from its gelatinous water-wet state directly in the organic film-forming material without previously having dried or calcined the precipitate, whereby agglomeration and/or aggregation of the minute precipitated particles is prevented and the dispersed particles are in substantially the same form as when they were originally precipitated.

By the term, "nickelous hydroxide," as used in the description of this invention, is meant the voluminous pale green gelatinous precipitate which occurs when a solution of a water soluble nickelous salt, such as the chloride, sulfate, or nitrate, is mixed with an excess of an inorganic base, such as sodium hydroxide, potassium hydroxide, and ammonium hydroxide. Similar precipitates have been referred to in the literature as $Ni(OH)_2$, $4Ni(OH)_2.H_2O$, and $NiO.H_2O$ and have been called nickelous hydroxide or hydrated nickelous oxide. These precipitates are colloidal. The correct name may be debatable; but, for convenience the term "nickelous hydroxide" is used herein to refer to the above described precipitate. It is also to be understood that the above description is to serve only as a means of identifying the term "nickelous hydroxide" and not necessarily as a recital of the only method whereby such a precipitate may be formed.

For the greatest improvements resulting from this invention, it is preferred to use a nickelous hydroxide precipitated from a solution of nickelous chloride by a solution of sodium hydroxide.

This inorganic precipitate of nickelous hydroxide, when properly further treated and dispersed uniformly, or suspended, in an organic film-forming material, as hereinafter disclosed, yields the new coating compositions of this invention which possess, in relatively thin films on the order of not more than 5 mils (0.005) in. thick, the hitherto unknown simultaneous combination in pigmented organic coatings of four desirable properties: (1) Absence of substantial amount of visible original color resulting from the suspended material, (2) absence of substantial amount of original opacity resulting from the suspended material, (3) substantial extension of the life of the film resulting from the suspended material, and (4) absence, during the thus prolonged life of the film, of objectionable color and/or opacity developed by the suspended material as a result of normal service.

This four-fold result is unique and quite unexpected since the precipitate in water is noticeably green and cloudy. It is not clear and colorless, and its characteristics would not suggest its use in organic coatings where color and opacity are to be avoided. Furthermore, metal hydroxides or metal hydrous oxides are not recognized as a group of compounds eminently suitable for such purposes because each has at least one known undesirable characteristic in color, opacity or durability. For instance, ferrite yellow, which is considered a hydrated iron oxide, is yellow and opaque. Colloidal ferric hydroxide is transparent, but it is red or brown in color. Colloidal silicon dioxide is originally colorless and transparent, but it is non-durable and imparts opacity to the film after a short period of outdoor exposure. Aluminum hydroxide is colorless and transparent, but does not materially prolong the life of the film. Titanium dioxide is opaque. Titanium hydroxide (titanic acid) quickly becomes opaque in an organic film exposed outdoors. Calcined chromium tetrahydrate (Guignet's green) is strongly colored. Chromium hydroxide is objectionably strong in green color.

The following examples illustrate the methods by which this invention is carried out and products of this invention. The parts are by weight.

PREPARATION OF NICKELOUS HYDROXIDE PRECIPITATE 715 parts of technical grade $NiCl_2.6H_2O$ are dissolved in 4000 parts of water. In another vessel 250 parts of commercial NaOH are dissolved in 4000 parts of water. The sodium hydroxide solution is added to the nickelous chloride solution slowly over a period of 15 minutes while the mixture is agitated vigorously. Agitation is maintained for about five minutes and then discontinued. A voluminous gelatinous light green precipitate of nickelous hydroxide has formed. The pH of the system is about 12. The water-precipitate slurry is then pumped through a filtering system and washed with water until the wash water shows no appreciable chloride ion content resulting from chlorides leached from the filtered mass. Washing requires about eight hours. The resulting filter cake, referred to as "pulp pigment" is a stiff wet opaque green gel containing about 30% solids and 70% water. It is removed from the filter in this form and stored at room temperature in airtight containers to prevent drying.

Other precipitates of nickelous hydroxide are made similarly by using equivalent amounts of nickelous nitrate and nickelous sulfate respectively in place of the chloride. Useful precipitates result, which have substantially the same properties as the precipitate from the chloride.

However, the latter is preferred because of very small superiority in important properties which becomes apparent only upon critical examination and outdoor exposure in organic coatings.

Example I 333 parts of the 30% solids nickelous hydroxide precipitate, prepared as described under the heading "Preparation of nickelous hydroxide precipitate" above, which had been kept in its original water-wet pulp form, are placed in a jacketed Werner and Pfleiderer kneading-type dispersion mill, which is commonly used in the art of "flushing" or transferring pulp pigments from their water-wet state directly into an organic vehicle. Kneading is started as 100 parts of an alkyd resin solution are added to the mill. This resin contains 50% common hydrocarbon solvents and 50% solid resin (35% linseed, 15% China-wood oil modified glyceryl phthalate resin with 2.2% "excess" glycerine). When the mixture becomes relatively uniform, cooling water is run through the jacket to prevent loss of solvent and to increase the consistency of the batch and provide maximum forces for dispersion. Shortly the "shedding" of water from the dispersion begins; and, as kneading continues, the water thus displaced from the mass is removed from the mill. When about 140 parts of water have been shed in this fashion, further milling produces no more water. At this point the cooling water is turned off and 300 parts of the same resin solution used previously in this example are added at substantially the rate the resin is absorbed in the kneaded mass. Then 230 parts of mixed aliphatic and aromatic hydrocarbon solvent are added and thoroughly incorporated into the mixture. The mill is closed tightly and fitted with a reflux condenser suitable for isolating condensed water. A steam supply to the jacket of the mill is turned on, and a vacuum is applied to the mill. Refluxing is conducted at 45–65 mm. Hg and a vapor temperature of 25–40° C. at the top of the condenser. In one hour 89 parts of water have been collected by azeotropic distillation and the rate of further collection has dropped to an uneconomical point. The resulting coating composition of nickelous hydroxide and alkyd resin (50% pigment based on resin solids) has approximately the following composition:

| | Per cent |
|---|---|
| 35% linseed 15% China-wood oil modified glyceryl phthalate resin (2.2% "excess" glycerine); solids | 28 |
| Nickelous hydroxide precipitate | 14 |
| Conventional mixed hydrocarbon solvents for alkyd resin enamels | 58 |
| | 100 |

It flows freely at room temperature, is pale green in color, and is opaque (as determined by holding a full 2 ounce clear glass bottle before a light source).

Water-wet nickelous hydroxide precipitates can be "flushed" into other organic film-forming materials by following the above pattern and adjusting the amounts of pigment, film former, and solvent to suit the individual circumstances, which conditions are familiar to those skilled in the art of transferring water-wet precipitates to an organic medium.

Other alkyd resins may be used in varying proportions in this example. The resin may be modified with other vegetable drying, semi-drying or non-drying oils or fatty oil acids, depending on the properties desired in the finished coating composition.

Example II

The product of Example I is blended with conventional pigments ground in the same alkyd resin and with conventional driers and solvents to produce an air drying blue enamel of the following composition:

| | |
|---|---|
| Nickelous hydroxide precipitate (solids) | 20.0 |
| Milori iron blue | 10.0 |
| Titanium dioxide | 10.0 |
| 35% linseed 15% China-wood oil modified glyceryl phthalate resin (2.2% "excess" glycerine) | 100.0 |
| Drier solution; Co, Pb, Mn | 6.5 |
| Conventional mixed hydrocarbon solvents for alkyd resin enamels | 104.0 |
| | 250.5 |

This enamel has better outdoor durability characteristics than an analogous conventional (standard) enamel of the same visual color containing no nickelous hydroxide and 20 parts each of milori blue and titanium dioxide. The improvements appear principally as freedom from chalking and dulling for a longer period than the standard enamel. Furthermore, the nickel-containing enamel completely hides the substrate in normal film thicknesses. Thus it provides the required color and opacity, plus improved durability, and uses only half the normal amount of conventional durable pigments.

Example III

A pigmented material similar to the product of Example I is made in the manner disclosed in that example by incorporating 167 parts of 50% solid water-wet nickelous hydroxide (50 parts of solid precipitate) into 230 parts of a 50% solids solution of a 50% China-wood/soya bean oil modified pentaerythritol phthalate resin containing 4% "excess" pentaerythritol in hydrocarbon solvents (115 parts of solid resin).

Aluminum flake pigment and phthalocyanine green pigment, separately dispersed in the same resin, are added to produce a baking type green metallic (polychromatic) automobile body enamel of the following composition:

| | |
|---|---|
| Nickelous hydroxide precipitate (solids) | 15.0 |
| Coarse aluminum flake | 3.3 |
| Phthalocyanine green | 2.0 |
| 50% China-wood/soya bean oil modified pentaerythritol phthalate resin (4% "excess" pentaerythritol) | 100.0 |
| Cobalt drier solution | 1.0 |
| Mixed hydrocarbon solvents | 126.0 |
| | 247.3 |

The resulting enamel is superior to an analogous conventional (standard) enamel of the same visual color containing no nickelous hydroxide and 3.3 parts of coarse aluminum and 2.0 parts of phthalocyanine green. The superiority is shown in greater ease of applying a smooth uniform film by spraying, higher original gloss, and absence of mottle in the appearance of the dried coating. In addition, the nickel-containing product maintains its color and gloss for longer than the standard product when they are exposed outdoors, where the standard enamel quickly loses its original gloss and becomes more gray in color.

Example IV

The nickelous hydroxide-alkyd resin dispersion prepared in Example III is blended with aluminum pigment and a synthetic iron oxide pigment, separately dispersed in the same resin, to produce a baking type red polychromatic enamel of the following composition:

| | |
|---|---:|
| Nickelous hydroxide precipitate (solids) | 13.5 |
| Aluminum flake pigment | 3.3 |
| Synthetic iron oxide red, $Fe_2O_3$ | 1.0 |
| 50% China-wood/soya bean oil modified pentaerythritol phthalate resin (4% "excess" pentaerythritol) | 119.0 |
| 33% China-wood oil-phenol formaldehyde varnish (solids) | 4.0 |
| Drier solution, cobalt | 0.7 |
| Varnish Makers and Painters Naphtha, and other hydrocarbon solvents | 143.0 |
| | 284.5 |

This enamel has the same advantages over an analogous composition containing no nickelous hydroxide as those given in Example III.

Example V

A pigmented organic film-forming composition is made by the kneading-azeotropic distillation technique shown in Example I. The resulting product has the following composition:

| | |
|---|---:|
| Nickelous hydroxide precipitate (solids) | 3.3 |
| Resin solids¹ | 168.0 |
| Drier solution; Co, Pb, Mn | 8.0 |
| Hydrocarbon solvents | 261.0 |
| | 441.0 |

¹ The resin is the heat reaction product of 9.5 parts WG rosin, 47.5 parts linseed oil fatty acids and 43 parts "Epon"-1004 (epichlorhydrin-diphenylolpropane reaction product).

A thin coating of this clear finish (about 2% pigment based on resin solids) has the same original properties as an analogous composition containing no nickelous hydroxide; i. e., excellent transparency, absence of visible color other than that of the film-forming material, high gloss, good drying properties, and good application characteristics. In addition, the nickel-containing product has considerably better durability outdoors.

Example VI

A precipitate as produced under "Preparation of nickelous hydroxide precipitate" is "flushed" into an oleoresinous varnish by the same technique as used in Example I. The pigmented product has the following composition:

| | |
|---|---:|
| Nickelous hydroxide precipitate (solids) | 5 |
| 48 gallon oil length varnish made from China-wood oil, soya bean oil, rosin, and ester gum (solids) | 60 |
| Drier solution; Co, Pb, Mn | 4 |
| Hydrocarbon solvents | 72 |
| | 141 |

A film of this pigmented varnish has the same color, transparency and other properties as the varnish itself and is considerably superior in outdoor durability.

Other oleoresinous varnishes made from various vegetable oils and natural, treated natural or synthetic resins may be used in place of the varnish of this example. Such resins include rosin esters, limed rosin, copals, damars, congos, phenol-formaldehyde type, etc.

In the same manner as previously described water-wet nickelous hydroxide is transferred directly into other organic film formers to produce the composition shown in the following Examples VII and VIII.

Example VII

| | |
|---|---:|
| Nickelous hydroxide precipitate (solids) | 15.0 |
| 43% dehydrated castor oil modified glyceryl phthalate resin | 70.0 |
| Butyl alcohol modified ureaformaldehyde resin | 78.0 |
| Butyl alcohol and hydrocarbon solvents | 147.0 |
| | 310.0 |

A duplicate of this composition is prepared substituting 78 parts of a butyl alcohol modified melamine formaldehyde resin for the urea-formaldehyde resin.

These are baking type clear synthetic resin finishes.

Example VIII

| | |
|---|---:|
| Nickelous hydroxide precipitate (solids) | 6.0 |
| 25 gallon oil length China-wood oil phenol-formaldehyde varnish (solids) | 67.0 |
| Drier solution; Co, Pb, Mn | 2.0 |
| Hydrocarbon solvents | 71.0 |
| | 146.0 |

This is an air-drying clear varnish.

Films of the pigmented products of Examples VII and VIII look the same as the respective unpigmented films and have better outdoor durability.

Example IX

Using the dispersion or "flushing" method described in Hucks U. S. Patent 2,140,745, a water-wet nickelous hydroxide precipitate was dispersed in a nitrocellulose vehicle to yield a lacquer base of the following composition:

| | |
|---|---:|
| Nickelous hydroxide precipitate (solids) | 14.3 |
| Nitrocellulose, ¼ second | 38.0 |
| Blown castor oil | 7.8 |
| Dibutyl phthalate | 9.8 |
| | 69.9 |

This composition is pale green and opaque as observed by holding a full 2 oz. clear glass bottle in front of a light source.

Example X

The product of Example IX is blended with other lacquer-making materials to produce a clear finish of the following composition:

| | |
|---|---:|
| Nickel hydroxide precipitate (solid) | 7.0 |
| Nitrocellulose, ¼ second | 18.6 |
| Blown castor oil | 3.8 |
| 55% castor oil modified glyceryl phthalate resin (3% "excess" glycerine) | 8.6 |
| Ester, alcohol, and hydrocarbon solvents | 57.2 |
| | 100.0 |

Example XI

In a manner similar to that shown in Examples IX and X, a nickelous hydroxide precipitate is dispersed in a lacquer vehicle and further blended with lacquer-making components to produce a clear lacquer of the following composition:

| | |
|---|---:|
| Nickelous hydroxide precipitate (solids) | 6.0 |
| Nitrocellulose, ¼ second | 10.7 |
| Blown castor oil | 3.1 |
| Dibutyl phthalate | 4.6 |
| Granular n-butyl methacrylate polymer | 8.4 |
| Ester, alcohol, and hydrocarbon solvents | 67.2 |
| | 100.0 |

The products of Examples X and XI are clear lacquers. They are superior in outdoor durability to analogous ones containing the same film-forming materials respectively.

*Example XII*

A white pigmented lacquer of the following composition is made by the method disclosed in U. S. Patent 2,140,745:

| | |
|---|---:|
| Nickelous hydroxide precipitate (solids) | 4.8 |
| Nitrocellulose, ¼ second | 15.6 |
| Castor oil | 3.1 |
| Dibutyl phthalate | 4.7 |
| 53% cocoanut oil modified glyceryl phthalate resin | 7.2 |
| Titanium dioxide | 2.1 |
| Ester, alcohol and hydrocarbon solvents | 62.5 |
| | 100.0 |

A duplicate of this formula is prepared substituting 4.8 parts of blanc fixe for the nickel pigment. Comparative outdoor exposure results show that the nickel-containing formula is superior in gloss retention and resistance to chalking.

*Example XIII*

The same type of gelatinous water-wet nickelous hydroxide precipitate as is used in the previous examples is "flushed" into dioctyl phthalate by the kneading-azeotropic distillation procedure to produce a pigmented plasticizer of the following composition:

| | |
|---|---:|
| Nickel hydroxide precipitate (solids) | 10.0 |
| Dioctyl phthalate | 20.0 |
| | 30.0 |

Similar compositions can be made using other conventional plasticizers such as tricresyl phosphate, dibutyl phthalate, phthalyl glycolates, etc.

*Example XIV*

The pigmented composition of Example XIII is milled with a vinyl chloride resin, red pigment, and additional plasticizer to produce a flowable fabric coating paste of the following composition, which is a suspension of the resin and pigment in the plasticizer which is a solvent for the resin at elevated temperature:

| | |
|---|---:|
| Nickelous hydroxide precipitate (solids) | 10.0 |
| Powdered polyvinyl chloride resin | 40.6 |
| Dioctyl phthalate | 24.4 |
| Red pigment | 25.0 |
| | 100.0 |

This composition is applied, in several coats, to a cotton fabric running 1.02 yards to the pound at 58" width to deposit 12.3 ounces of dry coating per yard 54" wide. The coating process is followed by heating to fuse the composition into a continuous film on the fabric. The resulting fabric has better outdoor durability than a similar one containing no nickelous hydroxide.

*Example XV*

Transparent unsupported films possessing superior outdoor durability are made from nickelous hydroxide precipitate and conventional resinous materials such as vinylidene copolymers, vinyl copolymers, polymers of ethylene and chlorinated and/or chlorosulfonated derivatives thereof by conventional casting, extrusion, and/or calendering methods.

The above examples illustrate improvements in films pigmented with a nickelous hydroxide precipitate. It is to be understood that the specific film-forming materials used in the examples are only illustrative of the vast variety of film-formers which are conventionally pigmented for the color, opacity, or durability characteristics thereby obtained. Since all of the experiments to date show some superiority in desirable properties derived from the nickelous hydroxide, it is believed that film-forming materials generally, including many individual ones and combinations not shown, can be improved similarly by incorporating the type of nickelous hydroxide disclosed by the methods shown above; and this invention embraces pigmented organic films and coating compositions generally.

It is obvious to those skilled in the art that nickelous hydroxide can be prepared by many procedures. The critical factors which apparently produce the unexpected results are washing the precipitate substantially free of salt ions, keeping the precipitate wet with water to prevent agglomeration and aggregation of the primary particles, and dispersing the thus preserved precipitate in the organic film-forming material, whereby the primary particles become uniformly and individually suspended in the organic composition. Nickelous hydroxide precipitates capable of fulfilling these requirements can most easily be made by mixing solutions of soluble nickelous salts and inorganic bases. The pH of the precipitated mixture should be above 7 and, for greatest ease in filtering and washing, should be preferably above 10. However, with somewhat more difficulty or at greater expense, other reactions can be used such as reacting nickelous acetate, carbonate, or tartrate with a base. Also other methods of hydrolyzing various nickelous salts may be employed, including the use of ion exchange resins.

The temperatures and pressures used in the milling, "flushing," or dispersion step, as shown, are not critical. Those shown merely represent a reasonable compromise among several factors—cost, power consumption, speed, and optimum properties of the product. Other temperatures and pressures can be used including room temperature and atmospheric pressure if desirable or necessary.

"Flushing" can be undertaken in any form whereby work (shear) can be applied to the mixture to displace water with organic material, and the Werner and Pfleiderer mixer is only one of many types of suitable dispersion mills. Wetting or other surface active agents innocuous to the composition may be used if desired. In instances where water is not detrimental to the final composition such as in coating materials containing water as part of the vehicle, removal is not necessary; and any portion or all of the water may be retained by shortening or eliminating any unnecessary step in the "flushing" or dispersion process.

The examples show a wide range of ratios by weight of nickelous hydroxide to organic film-forming material (binder). These ratios are not critical in coatings containing coloring or opacifying pigments except that, normally, pigments do not comprise more than half of the dried film.

In so-called "clears," or transparent varnishes, resins, and lacquers; as the nickelous hydroxide concentration increases, a slight transparent green color occurs. Up to 10–20 parts by weight of nickelous hydroxide to 100 parts of binder, depending upon the color of the binder, this green is not particularly noticeable and is hence not objectionable. In most cases, between 5 and 10 parts of nickelous hydroxide are preferred in "clears" although considerably higher amounts can be used where protection of the substrate is more important than a slight green color in the clear.

Although an important feature of the products of this invention is improved outdoor durability, the products can be used advantageously elsewhere. For instance, certain decorative effects, which are desirable on indoor metal partitions, furniture, and business machines, require such high concentrations of aluminum flake pigment that application characteristics of the liquid composition are very poor, and mottles and other surface irregularities occur. Incorporation of the nickelous hydroxide of this invention permits a reduction of the aluminum pigment content without a change in color, and the resulting product is a smooth mottle-free coating of improved appearance.

Beside the uses disclosed in the examples and in the description of this invention, the products are useful as clear coatings for wood floors, polished metal work, mahogany boat hulls, boat decks, masts, booms, etc., wood automobile bodies, metal substrates artificially grained to look like wood, and enamelled signs. The products of this invention are also useful in coatings containing other pigments, such as drying oil type house paints, trim enamels, quick drying furniture enamels, polychromatic automobile body finishes, wood and metal primers, colored coated fabrics, and clear, colored or opaque unsupported films.

As many widely different embodiments of this invention may be made without departing from the spirit and scope thereof, it is to be understood that the invention is not limited except as defined in the appended claims.

I claim:

1. A coating composition comprising an organic film-forming material, which dries to a tough, durable, water-resistant film, and a pigment consisting of colloidal nickelous hydroxide, said nickelous hydroxide having been retained in a gelatinous water-wet state during the entire period between its formation and its incorporation in the said coating composition.

2. A coating composition of claim 1 which contains between about 2 and 50 parts by weight of nickelous hydroxide for each 100 parts of film-forming material.

3. A transparent coating composition of claim 1 which contains from 5 to 10 parts of nickelous hydroxide for each 100 parts of film-forming material.

4. The composition of claim 1 in which the film-forming material is an alkyd resin.

5. The composition of claim 1 in which the film-forming material is nitrocellulose.

6. The composition of claim 1 in which the film-forming material is an oleoresinous varnish.

7. The composition of claim 1 in which the film-forming material is a vinylidene resin.

8. The composition of claim 1 in which the film-forming material is an alcohol modified amino-aldehyde resin.

9. A process of making a film-forming composition that dries to a tough durable water-resistant film, which comprises dispersing a pigment consisting of gelatinous water-wet colloidal nickelous hydroxide uniformly throughout an organic film-forming material.

10. A film comprising a tough durable water-resistant organic film-forming material and a pigment consisting of colloidal nickelous hydroxide, said nickelous hydroxide having been retained in a gelatinous water-wet state during the entire period between its formation and its incorporation in the said film-forming material.

11. A fabric base having an adherent coating of the product of claim 1.

12. A transparent unsupported film comprising a tough durable water-resistant organic film-forming material and a pigment consisting of colloidal nickelous hydroxide, said nickelous hydroxide having been retained in a gelatinous water-wet state during the entire period between its formation and its incorporation in the said film-forming material.

13. The film of claim 10 in which there are about 2–50 parts by weight of nickelous hydroxide for each 100 parts of film-forming material.

14. The film of claim 12 in which there are about 2–50 parts by weight of nickelous hydroxide for each 100 parts of film-forming material.

15. The process which comprises dispersing a washed precipitate of nickelous hydroxide in an organic film-forming material, said precipitate consisting of undried gelatinous colloidal nickelous hydroxide prepared by precipitating nickelous hydroxide from a water solution of a nickelous salt, thereafter separating the gelatinous colloidal nickelous hydroxide precipitate, and washing said precipitate.

References Cited in the file of this patent

UNITED STATES PATENTS

| Number | Name | Date |
| --- | --- | --- |
| 2,084,825 | Ruben | June 22, 1937 |
| 2,167,278 | Leatherman | July 25, 1939 |